United States Patent
Park et al.

(10) Patent No.: US 10,177,991 B2
(45) Date of Patent: Jan. 8, 2019

(54) VIEW SENSOR, HOME CONTROL SYSTEM INCLUDING VIEW SENSOR, AND METHOD OF CONTROLLING HOME CONTROL SYSTEM

(71) Applicant: SAMSUNG ELECTRONICS CO., LTD., Suwon-si (KR)

(72) Inventors: Sang-bae Park, Cheongju-si (KR); Sang-hoon Lee, Incheon (KR); Jae-hoon Jeong, Suwon-si (KR); Kyung-sun Cho, Seoul (KR); Seong-seol Hong, Yongin-si (KR); Dong-jin Lee, Suwon-si (KR); Mi-jin Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 386 days.

(21) Appl. No.: 14/619,360

(22) Filed: Feb. 11, 2015

(65) Prior Publication Data
US 2015/0244990 A1    Aug. 27, 2015

(30) Foreign Application Priority Data

Feb. 26, 2014  (KR) .................. 10-2014-0022466

(51) Int. Cl.
*H04N 7/18*        (2006.01)
*G06K 9/00*        (2006.01)
(Continued)

(52) U.S. Cl.
CPC ........... *H04L 41/22* (2013.01); *H04N 9/3176* (2013.01); *H04N 9/3179* (2013.01);
(Continued)

(58) Field of Classification Search
None
See application file for complete search history.

(56) References Cited

U.S. PATENT DOCUMENTS 8,620,151 B2 * 12/2013 Lu ..................... G03B 21/28
                                                          352/138
9,838,573 B2  12/2017 Choi et al.
(Continued)

FOREIGN PATENT DOCUMENTS

CN      101943904 A      1/2011
CN      103677259 A      3/2014
CN      103814343 A      5/2014

OTHER PUBLICATIONS

Communication dated Oct. 15, 2018, issued by the State Intellectual Property Office of P.R. China in counterpart Chinese Application No. 201510088734.4.

*Primary Examiner* — Edemio Navas, Jr.
(74) *Attorney, Agent, or Firm* — Sughrue Mion, PLLC

(57) ABSTRACT

A view sensor, a home control system including the view sensor, and a method of controlling the home control system are provided. The view sensor includes: a lens unit configured to receive light in order to capture an image or project light in order to display the image; an image acquirer configured to acquire the image by using the light received from the lens unit; a projector configured to provide light to the lens unit in order to display the image; a beam splitter configured to provide the image acquirer with the light received from the lens unit or transmit the light generated by the projector to the lens unit; and a controller configured to, in response to the image being captured, control the beam splitter to provide the image acquirer with the light received from the lens and, in response to the image being displayed, control the beam splitter to provide the lens unit with the light generated by the projector.

19 Claims, 17 Drawing Sheets

(51) Int. Cl.
*H04L 12/24* (2006.01)
*H04N 5/232* (2006.01)
*H04N 5/247* (2006.01)
*H04N 9/31* (2006.01)
*H04N 21/422* (2011.01)
*H04N 21/4223* (2011.01)
*H04N 21/436* (2011.01)
*G06F 3/00* (2006.01)

(52) U.S. Cl.
CPC ... *H04N 21/4223* (2013.01); *H04N 21/42207* (2013.01); *H04N 21/42222* (2013.01); *H04N 21/42225* (2013.01); *H04N 21/43615* (2013.01); *G06F 3/00* (2013.01); *H04N 5/247* (2013.01)

(56) References Cited

U.S. PATENT DOCUMENTS

| | | | | |
|---|---|---|---|---|
| 2004/0017547 | A1* | 1/2004 | Kamm | G03B 17/54 353/28 |
| 2007/0291151 | A1* | 12/2007 | Dong | H04N 5/225 348/333.1 |
| 2008/0051135 | A1* | 2/2008 | Destain | G03B 17/54 455/556.1 |
| 2011/0202957 | A1* | 8/2011 | Cho | G08C 17/02 725/38 |
| 2011/0241986 | A1* | 10/2011 | Feng | G03B 21/14 345/158 |
| 2012/0317592 | A1* | 12/2012 | Kim | H04N 21/27 725/14 |
| 2013/0021374 | A1 | 1/2013 | Miao et al. | |
| 2014/0078311 | A1 | 3/2014 | Choi et al. | |

* cited by examiner

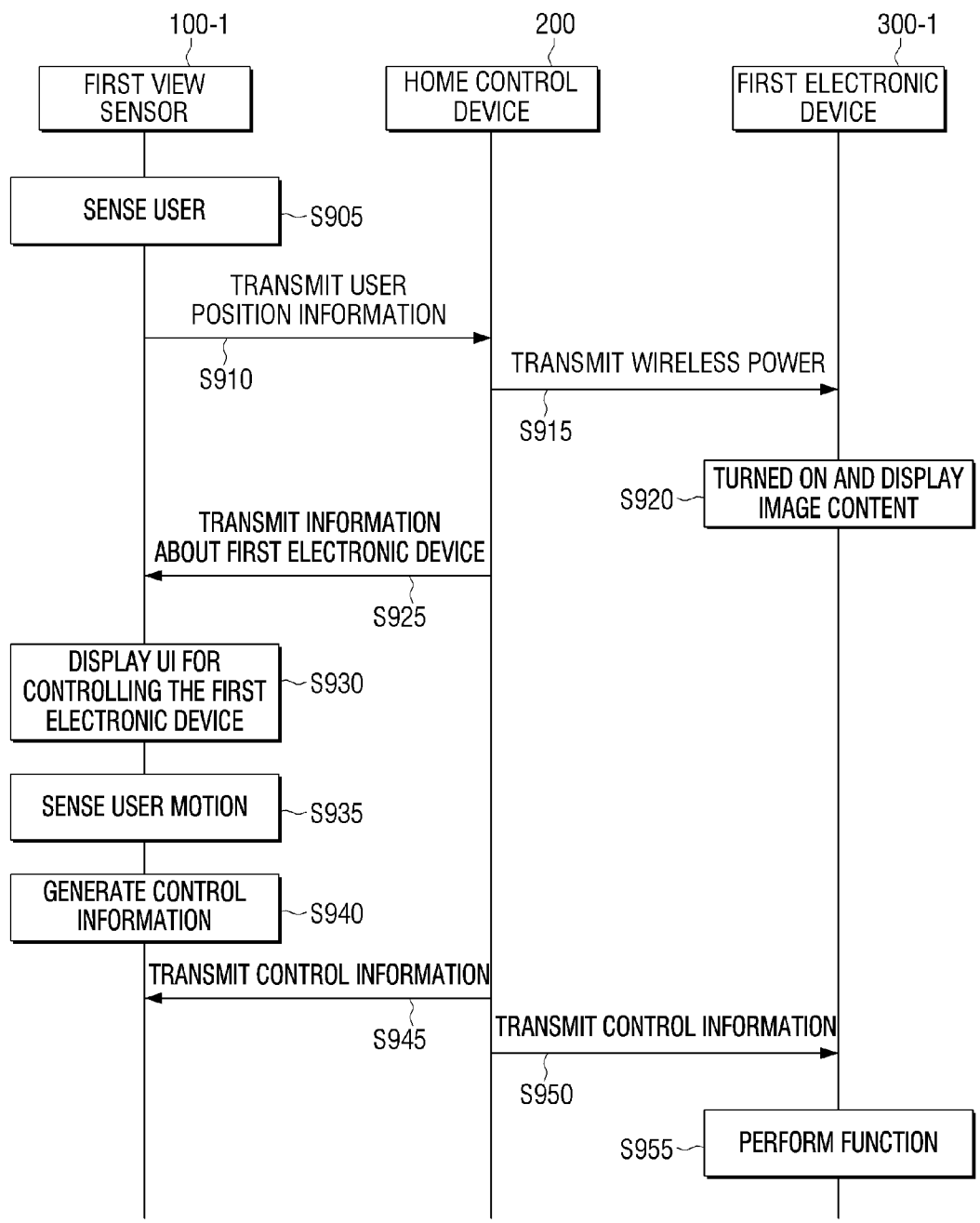

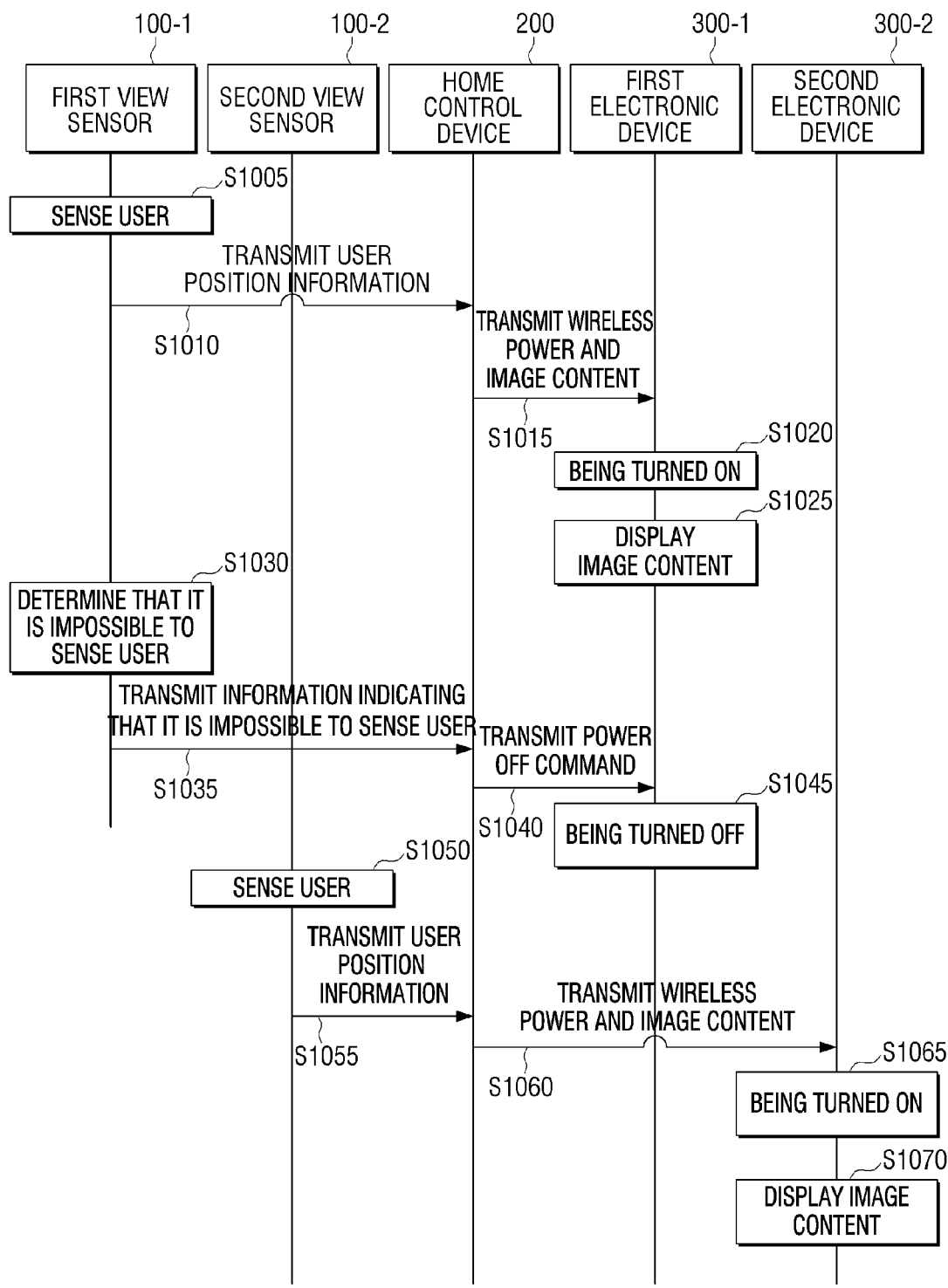

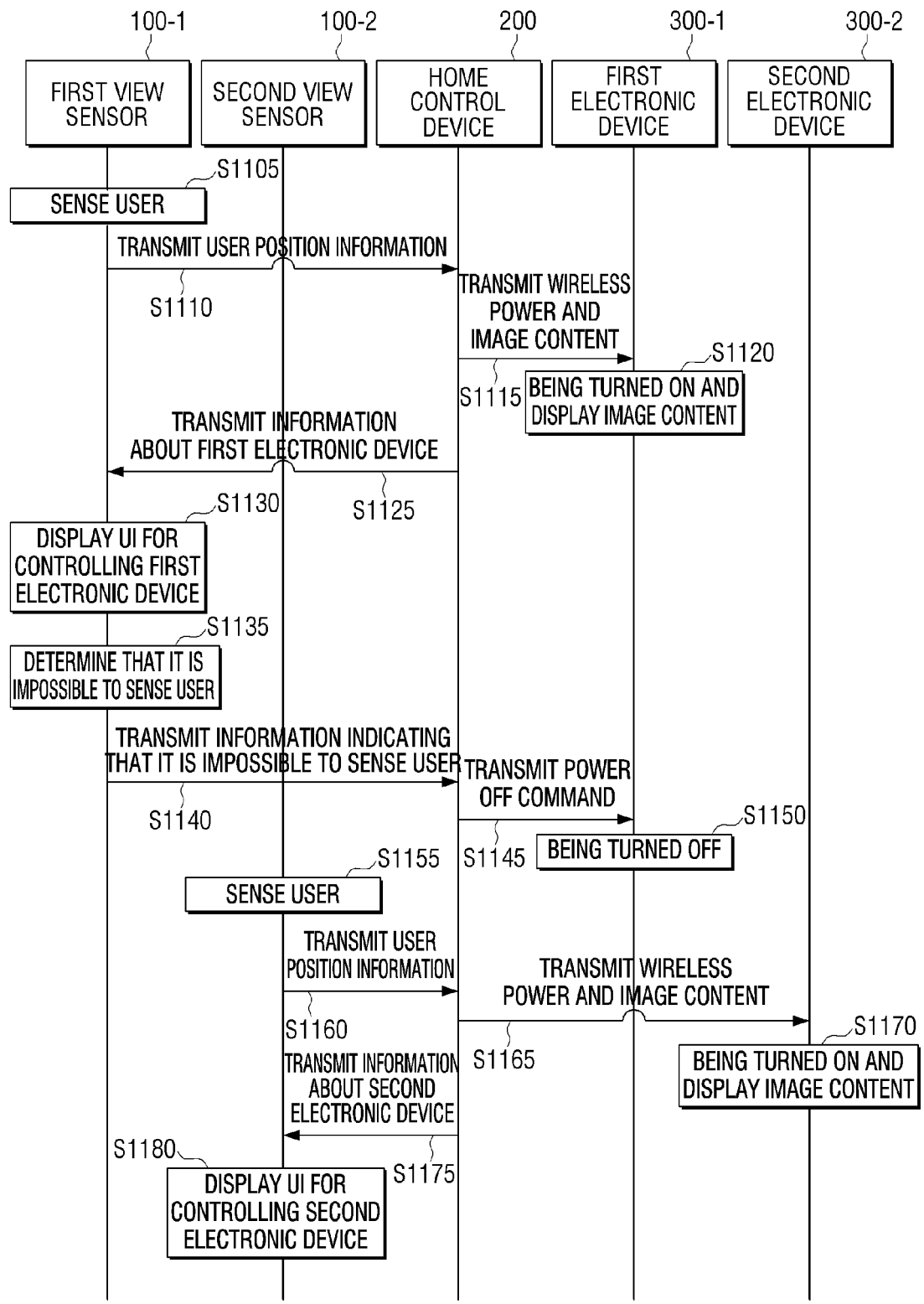

VIEW SENSOR, HOME CONTROL SYSTEM INCLUDING VIEW SENSOR, AND METHOD OF CONTROLLING HOME CONTROL SYSTEM

CROSS-REFERENCE TO RELATED APPLICATION(S)

This application claims priority under 35 U.S.C. § 119 from Korean Patent Application No. 10-2014-0022466, filed on Feb. 26, 2014, in the Korean Intellectual Property Office, the disclosure of which is incorporated herein by reference in its entirety.

BACKGROUND

1. Field

The exemplary embodiments generally relate to providing a view sensor, a home control system including the view sensor, and a method of controlling the home control system, and more particularly, to providing a view sensor that captures a user and simultaneously displays an image, a home control system including the view sensor, and a method of controlling the home control system.

2. Description of the Related Art

Electronic devices having various functions have been recently provided to homes. In particular, home electronic devices have been independently developed and respectively provide different Ubiquitous service exchange (UX) types. Also, the number of remote controllers has increased in proportion to an increase in the number of home electronic devices.

The home electronic devices are typically installed in places where the user is positioned, but may not enable the user to continuously view content that the user is viewing when the user walks around the home. Since a plurality of electronic devices may provide different UX types, it may be difficult for the user to smoothly control the plurality of electronic devices.

Also, various types of remote controllers may be provided to control the plurality of electronic devices. However, the user may not remember a position of a remote controller corresponding to an electronic device that the user wants to control. If the user does not find the remote controller corresponding to the electronic device that the user wants to control, the user may not be able to control the electronic device or may be required to manually control the electronic device by using a button installed in the electronic device.

Other types of electronic devices may share contents through one-to-one communication or may use the contents through a cellular phone having a remote control function. Also, electronic devices may be controlled through voice recognition or motion recognition. However, it is very inconvenient for the user to establish an environment setting in order to execute the one-to-one communication. Also, if the cellular phone having the remote control function disappears, the user may be required to waste time to find the cellular phone. In addition, accuracy of the voice recognition or the motion recognition may be low, and there may be a problem with a performance of a sensor.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

An aspect of an exemplary embodiment provides a view sensor that captures a user to sense a position of the user and provides the user with a user interface (UI) for controlling the electronic device, a home control system including the electronic device, and a method of controlling the home control system.

According to an aspect of an exemplary embodiment, there is provided a view sensor including: a lens unit configured to receive light in order to capture an image or project light in order to display the image; an image acquirer configured to acquire the image by using the light received from the lens unit; a projector configured to provide light to the lens unit in order to display the image; a beam splitter configured to provide the image acquirer with the light received from the lens unit or transmit the light generated by the projector to the lens unit; and a controller configured to, in response to the image being captured, control the beam splitter to provide the image acquirer with the light received from the lens unit and, in response to the image being displayed, control the beam splitter to provide the lens unit with the light generated by the projector.

The beam splitter may include: a prism configured to change a direction of the light received from the lens unit or the light provided from the projector; a first aperture configured to be positioned between the prism and the image acquirer in order to adjust an amount of the light provided to the image acquirer; and a second aperture configured to be positioned between the prism and the projector in order to adjust an amount of the light provided to the lens unit.

To capture the image, the controller may be configured to open the first aperture to provide the image acquirer with beams of the light that are received from the lens unit and reflected from the prism and close the second aperture to prevent the projector from receiving the beams of the light that are received from the lens unit and penetrate the prism. To display the image, the controller may be configured to open the second aperture to transmit the light provided from the projector.

The image acquirer may include: an image sensor configured to convert the light received from the lens unit into an electric signal; and an image processor configured to process the electric signal to generate the image.

The projector may include: a light source configured to provide red (R), green (G), and blue (B) beams; a light-emitting diode (LED) panel configured to generate the image based on the R, G, and B beams provided from the light source and transmit the generated image; and a digital light processing (DLP) chip configured to reflect the transmitted image toward the beam splitter.

The view sensor may further include: a communicator configured to communicate with an external device. The controller may be configured to control the communicator to analyze the image that includes an image of a user and is acquired by the image acquirer and generate user information and control information based on the analyzed image, and transmit at least one selected from the user information and the control information to the external device.

The controller may be configured to control the projector to generate a user interface (UI) for controlling an external device corresponding to the view sensor, and in response to a user motion being acquired through the image acquirer by using the UI, may be configured to analyze the user motion to generate the control information, and control the communicator to transmit the control information to the external device.

The controller may be configured to analyze the image acquired through the image acquirer to analyze user position information and control the communicator to transmit the analyzed user position information to the external device. The external device may be configured to analyze the user position information to transmit image content to an electronic device nearest to the user among a plurality of electronic devices.

According to another aspect of an exemplary embodiment, there is provided a home control system including: a plurality of electronic devices; a plurality of view sensors configured to display a user interface (UI) for controlling at least one electronic device selected from the plurality of electronic devices and capture an image of a user to acquire position information of the user and control information; and a home control device configured to receive position information of the user from a first view sensor of the plurality of view sensors, analyze the position information, transmit information about a first electronic device of the plurality of electronic devices corresponding to a position of the user to the first view sensor, and in response to control information being received from the first view sensor, transmit the control information to the first electronic device.

Each of the plurality of view sensors may include: a lens unit configured to receive light to capture an image or project light to display the image; an image acquirer configured to acquire the image by using the light received from the lens unit; a projector configured to provide light to the lens unit in order to display the image; a beam splitter configured to provide the image acquirer with the light received from the lens unit or transmit the light generated by the projector to the lens; and a controller configured to, in response to the image being captured, control the beam splitter to provide the image acquirer with the light received from the lens unit, and in response to the image being displayed, control the beam splitter to provide the lens unit with the light generated by the projector.

The beam splitter may include: a prism configured to change a direction of the light received from the lens unit or the light provided from the projector; a first aperture configured to be positioned between the prism and the image acquirer to adjust an amount of the light provided to the image acquirer; and a second aperture configured to be positioned between the prism and the projector to adjust an amount of the light provided to the lens unit.

In response to a second view sensor of the plurality of view sensors sensing the user moving when image content is displayed on the first electronic device, the second view sensor may be configured to transmit a position of the moved user to the home control device, and the home control device may be configured to transmit the image content to a second electronic device of the plurality of electronic devices corresponding to a position of the moved user.

The second view sensor may be configured to display a UI for controlling the second electronic device.

The first view sensor may be configured to capture a user motion by using a UI for controlling the first electronic device and to transmit a control command corresponding to the user motion to the home control device.

According to another aspect of an exemplary embodiment, there is provided a method of controlling a home control system. The method may include: in response to a first view sensor sensors sensing a user, the first view sensor being among a plurality of view sensors, transmitting position information of the sensed user from the first view sensor to a home control device; transmitting information about a first electronic device corresponding to the position information of the user from the home control device to the first view sensor; displaying a user interface (UI) for controlling the first electronic device using the first view sensor; sensing a user motion through the UI and generating control information and transmitting the generated control information from the first view sensor to the home control device; and transmitting the control information from the home control device to the first electronic device.

The method may further include: transmitting image content from the home control device to the first electronic device; in response to a second view sensor of the plurality of view sensors sensing movement of the user, transmitting position information of the moved user from the second view sensor to the home control device; and determining a second electronic device corresponding to a position of the moved user through the home control device based on the position information of the moved user and transmitting the image content to the second electronic device.

The method may further include: transmitting information about the second electronic device from the home control device to the second view sensor; displaying, by the second view sensor, a UI for controlling the second electronic device; sensing a user motion through the UI, generating control information based on the sensed user motion, and transmitting the generated control information to the home control device; and transmitting a control command based on the control information from the home control device to the second electronic device.

BRIEF DESCRIPTION OF THE DRAWINGS

The above and/or other aspects will be more apparent by describing certain exemplary embodiments with reference to the accompanying drawings, in which:

FIGS. 9, 10 and 11 are sequence diagrams illustrating methods of controlling a home control system, according to various exemplary embodiments;

DETAILED DESCRIPTION OF THE EXEMPLARY EMBODIMENTS

Figure 1A:
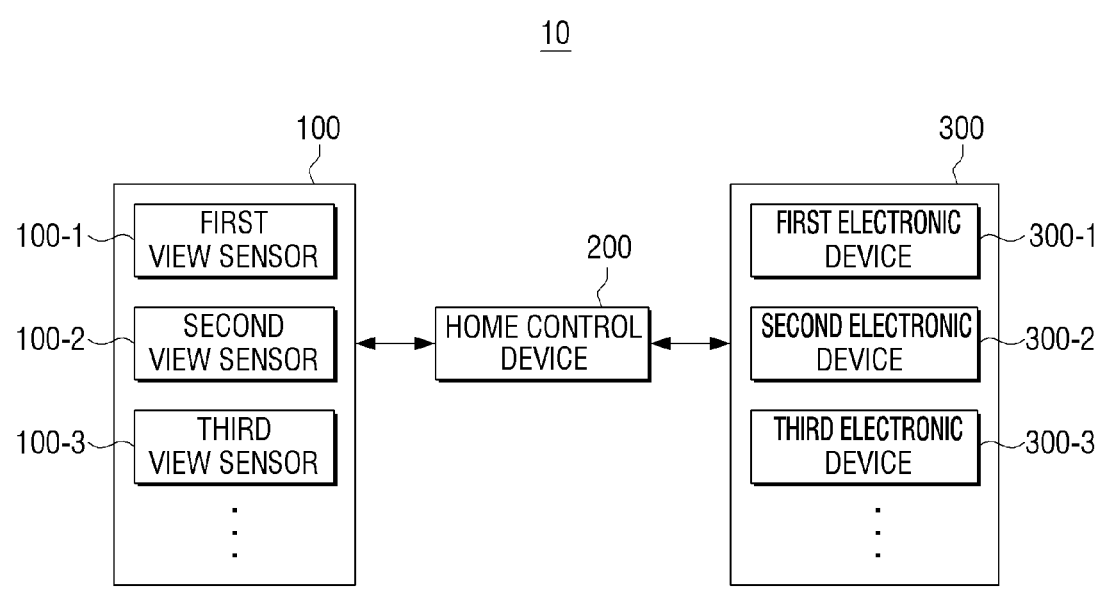
FIGS. 1A and 1B are a block diagram and a view illustrating a home control system according to an exemplary embodiment.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1A is a block diagram illustrating a structure of a home control system 10 according to an exemplary embodiment. Referring to FIG. 1A, the home control system 10 includes a plurality of view sensors 100-1 100-2, 100-3, 100-4, 100-5, 100-6, 100-7, 100-8, 100-9, and 100-10, a home control device 200, and a plurality of electronic devices 300-1, 300-2, 300-3, 300-4, 300-5, 300-6, 300-7, 300-8, 300-9, and 300-10. According to an exemplary embodiment, the plurality of electronic devices 300 are electronic devices that are installed in a home and may realized as various types of electronic devices such as a smart TV, a projection TV, a desktop personal computer (PC), an audio device, a washing machine, an air conditioner, a refrigerator, an illumination lamp, etc. It is understood that more or less than ten view sensors 100 and ten electronic devices 300 may be used according to exemplary embodiments.

Figure 1B:
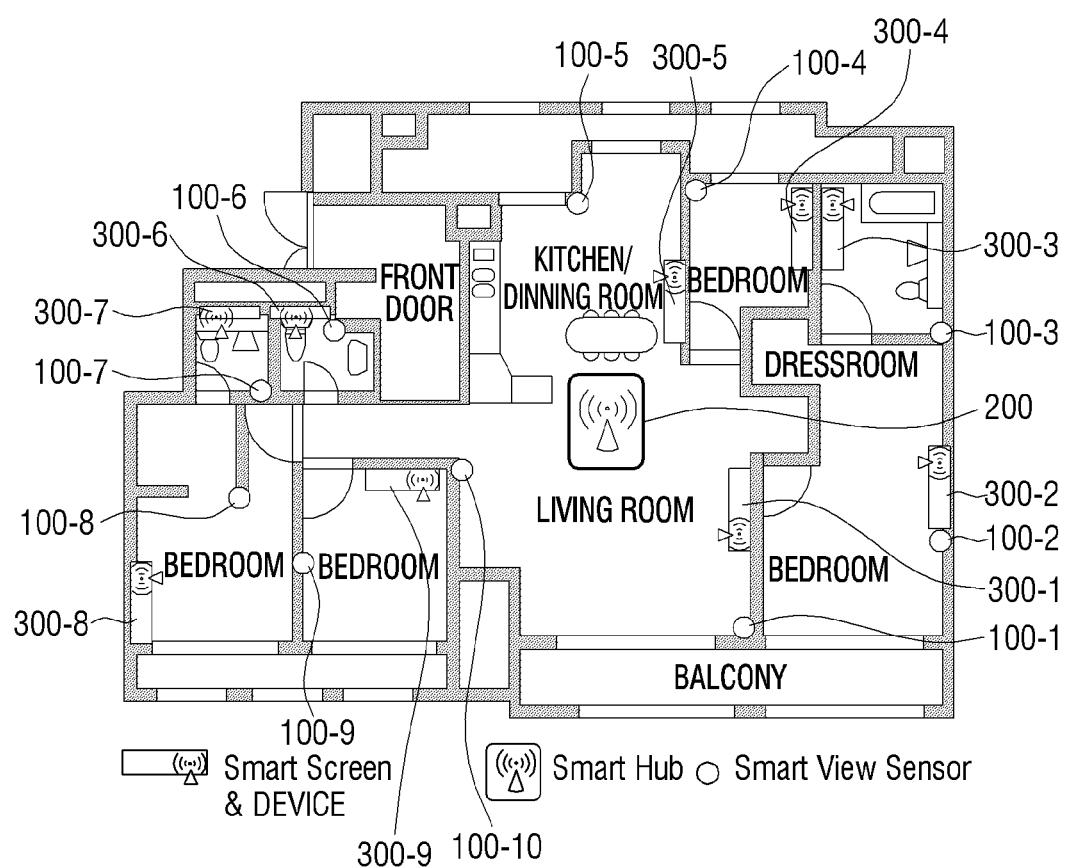

The home control system 10 according to the present exemplary embodiment may be installed in the home as shown in FIG. 1B. In particular, as shown in FIG. 1B, the home control device 200 may be installed in an arbitrary position of the home, and the plurality of the view sensors 100 and the plurality of electronic devices 200 may be installed in a plurality of places.

The view sensor 100 captures and simultaneously displays an image in order to sense a user or acquire a motion of the user. In particular, the view sensor 100 may simultaneously perform an image capturing function and an image display function by using a common lens and a beam splitter. In detail, if the sensor 100 captures the image, the view sensor 100 may control the beam splitter to provide an image acquirer with light received from the common lens. If the view sensor 100 displays the image, the view sensor 100 may control the beam splitter to provide the common lens with light provided from a projector. A method of performing the image capturing function and the image displaying function through the view sensor 100 will be described in detail later with reference to FIGS. 2 through 5.

The plurality of view sensors 100-1, 100-2, 100-3, . . . capture the image to sense whether the image includes the user. If the first view sensor 100-1 of the plurality of view sensors 100-1, 100-2, 100-3, . . . senses the user, the first view sensor 100-1 may transmit sensed position information of the user to the home control device 200. According to an exemplary embodiment, if the plurality of view sensors 100-1, 100-2, 100-3, . . . are respectively installed in fixed positions, particular IDs may be respectively allocated to the plurality of view sensors 100-1, 100-2, 100-3, . . . . Therefore, according to an exemplary embodiment, the first view sensor 100-1 may transmit particular ID information as position information of the user to the home control device 200. However, this is only an exemplary embodiment, and the first view sensor 100-1 may analyze the image to acquire position information of the user and transmit the acquired position information of the user to the home control device 200.

The home control device 200 determines the first electronic device 300-1 corresponding to the first view sensor 100-1 based on the position information of the user. Here, the first electronic device 300-1 corresponding to the first view sensor 100-1 may be an electronic device that is positioned nearest to the first view sensor 100-1.

The home control device 200 may also transmit wireless power to the first electronic device 300-1 corresponding to the first view sensor 100-1 to turn on the first electronic device 300-1. Also, the first electronic device 300-1 may be turned on to display image content. According to an exemplary embodiment, the image content may be image content that is transmitted to the home control device 200.

The home control device 200 may transmit information about the first electronic device 300-1 to the first view sensor 100-1. According to an exemplary embodiment, the information about the first electronic device 300-1 may include at least one selected from a type, a product name, a position, and a user interface (UI) structure of the first electronic device 300-1.

The first view sensor 100-1 may display a UI for controlling the first electronic device 300-1 based on the information about the first electronic device 300-1. According to an exemplary embodiment, the UI for controlling the first electronic device 300-1 may be an image that is projected onto one of a wall, a floor, and a piece of furniture.

If the motion of the user is sensed by using the UI for controlling the first electronic device 300-1, the first view sensor 100-1 may analyze the motion of the user to generate control information. For example, if a motion of the user for selecting a first icon of the UI for controlling the first electronic device 300-1 (e.g., a motion of the user or the like for clenching fists on the first icon) is sensed by using the image acquired by capturing the user, the first view sensor 100-1 may analyze the motion of the user to generate control information about the first icon. The controlling of the first electronic device 300-1 through the first view sensor 100-1 by using the UI is only an exemplary embodiment, and the first view sensor 100-1 may sense a general motion of the user to control the first electronic device 300-1. For example, if a motion of the user indicates that a hand of the user slaps upwards, regardless of the UI, the first view sensor 100-1 may generate control information for increasing a volume of the first electronic device 300-1.

The first view sensor 100-1 transmits the generated control information to the home control device 200. According to an exemplary embodiment, the control information may include a control command and information about a device that is to be controlled.

The home control device 200 may transmit the control command to the first electronic device 300-1 based on the generated control information. The first electronic device 300-1 may perform a function corresponding to the transmitted control command.

If the first view sensor 100-1 does not sense the user due to a movement of the user, the first view sensor 100-1 may transmit an event indicating that it is impossible to sense the user, to the home control device 200. The home control device 200 may respond to the event to transmit a power off command to the first electronic device 300-1.

If the second view sensor 100-2 senses the user, the second view sensor 100-2 may transmit position information of the user who has moved, to the home control device 200.

The home control device 200 determines the second electronic device 300-2 corresponding to the second view sensor 100-2 based on the position information of the user who has moved. According to an exemplary embodiment, the second electronic device 300-2 corresponding to the second view sensor 100-2 may be an electronic device that is installed nearest to the second view sensor 100-2.

The home control device 200 may also transmit wireless power to the second electronic device 300-2 corresponding to the second view sensor 100-2 to turn on the electronic device 300-2, and the second electronic device 300-2 may be turned on to display image content. According to an exemplary embodiment, the image content displayed on the second electronic device 300-2 may be image content that is the same as the image content displayed on the first electronic device 300-2 and is transmitted to the home control device 200. In other words, although the user moves to a different position, the user may continuously view the same image content.

The home control device 200 may transmit information about the second electronic device 300-2 to the second view sensor 100-2.

The second view sensor 100-2 may display a UI for controlling the second electronic device 300-2 based on the information about the second electronic device 300-2. According to an exemplary embodiment, the UI for controlling the second electronic device 300-2 may be a UI that is the same type as the UI for controlling the first electronic device 300-2, but this is only an exemplary embodiment. The UI for controlling the second electronic device 300-2 may be changed into different types of UIs according to characteristics of electronic devices. In other words, if both of the first and second electronic devices 300-1 and 300-2 are smart TVs, the first and second electronic devices 300-1 and 300-2 may display the same type of UIs. However, if the first electronic device 300-1 is a smart TV, and the second electronic device 300-2 is a refrigerator, the first and second electronic devices 300-1 and 300-2 may display different types of UIs.

As described above, the user may further conveniently and easily control various types of electronic devices installed in a home by using UIs displayed by a plurality of view sensors regardless of a position of the user.

Figure 2:
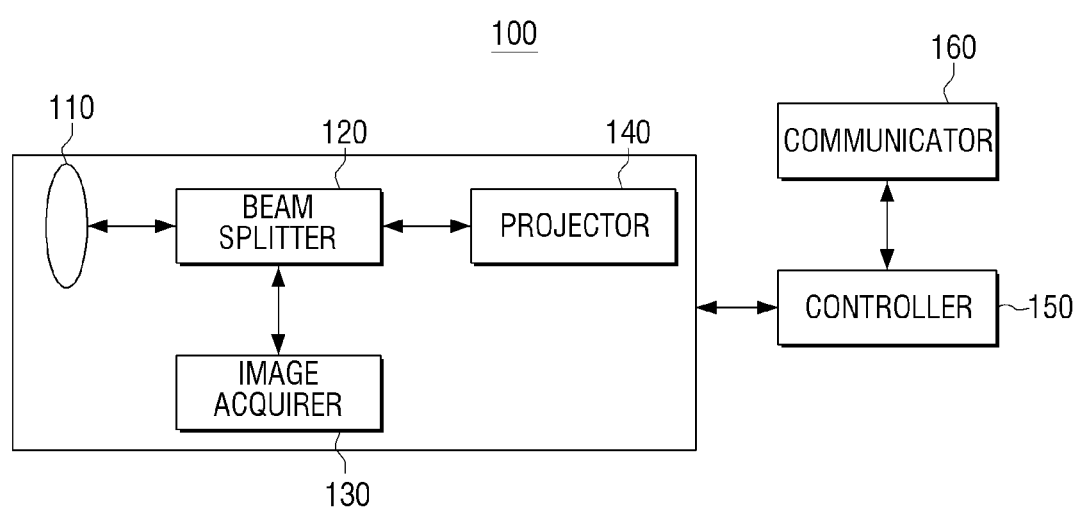
FIG. 2 is a block diagram illustrating a structure of a view sensor according to an exemplary embodiment.

The view sensor 100 will now be described in more detail with reference to FIGS. 2 through 6. FIG. 2 is a block diagram illustrating a brief structure of the view sensor 100, according to an exemplary embodiment. Referring to FIG. 2, the view sensor 100 includes a lens unit 110 (e.g., a single lens or a combination of a lens or lenses and other components), a beam splitter 120, an image acquirer 130, a projector 140, a controller 150, and a communicator 160.

The lens unit 110 receives light to capture an image and projects light to display the image. According to an exemplary embodiment, when the lens unit 110 performs an image capturing function or an image displaying function, the lens unit 110 may perform an auto focusing function.

The beam splitter 120 provides the image acquirer 130 with the light received from the lens unit 110 and provides the lens 110 with the light generated by the projector 140. In particular, the beam splitter 120 may control a path of light by using a prism and a plurality of apertures. In detail, if the image is captured, the beam splitter 120 may refract the light received from the lens unit 110 and provide the refracted light to the image acquirer 130. If the image is displayed, the beam splitter 120 may transmit the light provided from the projector 140 to provide the transmitted light to the lens unit 110.

The image acquirer 130 generates an image by using the light acquired through the lens unit 110. In detail, the image acquirer 130 may convert a beam, which is separated from the light acquired through the lens unit 110 by the beam splitter 120, into an electric signal through an image sensor and process the electric signal to generate image data.

The projector 140 provides the light to the lens unit 110 to display the image. According to an exemplary embodiment, the projector 140 may project the light by using a digital light processing (DLP) method, but this is only an exemplary embodiment. Therefore, the projector 140 may project the light by using other methods.

The controller 150 controls an overall operation of the view sensor 100. In particular, if the image is captured, the controller 150 may control the beam splitter 120 to provide the image acquirer 130 with the light received from the lens unit 110. If the image is displayed, the controller 150 may control the beam splitter 120 to provide the lens unit 110 with the light generated by the projector 140.

As described above, the view sensor 100 may control a path of light by using the lens unit 110 that is a common lens and the beam splitter 120 to simultaneously perform an image capturing function and an image displaying function.

Figure 3:
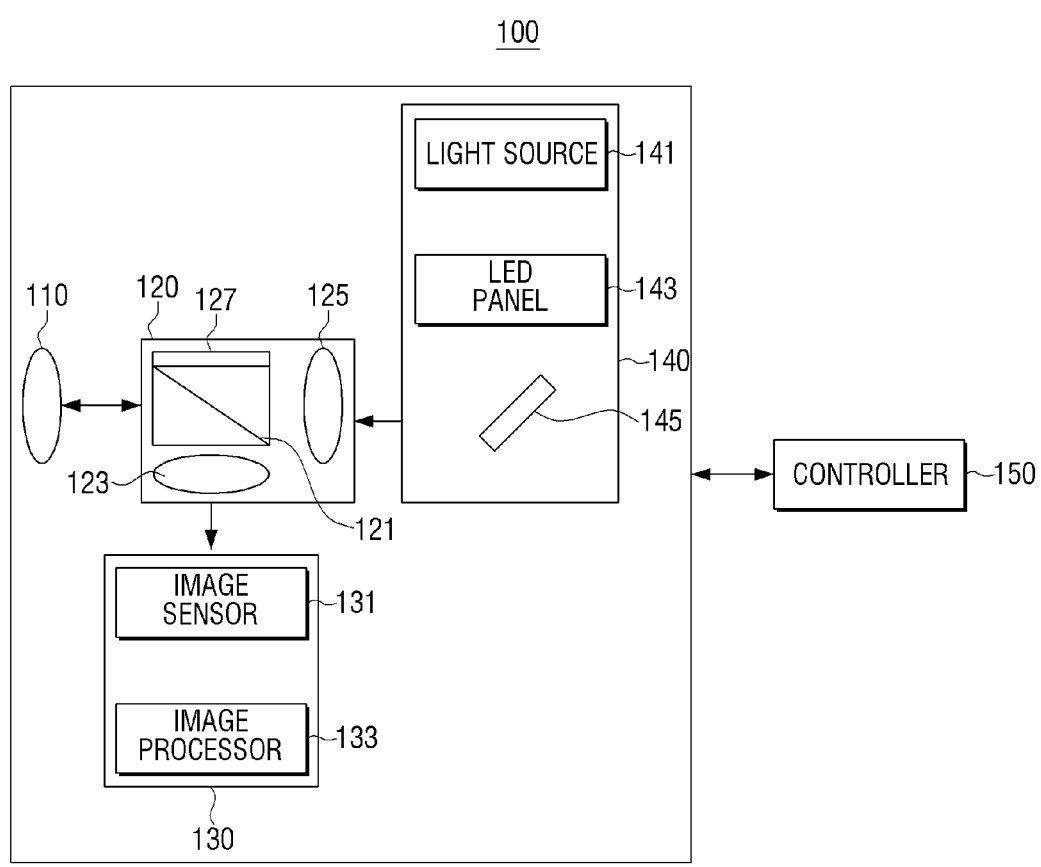
FIG. 3 is a detailed block diagram illustrating a structure of a view sensor according to an exemplary embodiment.

FIG. 3 is a detailed block diagram illustrating a structure of the view sensor 100, according to an exemplary embodiment. Referring to FIG. 3, the view sensor 100 includes the lens unit 110, the beam splitter 120, the image acquirer 130, the projector 140, the controller 150, and the communicator 160 (see FIG. 2) which communicates with an external device.

The lens unit 110 receives light to capture an image or projects light to display the image. According to an exemplary embodiment, the lens unit 110 may perform auto focusing when projecting the image by using an auto focusing function that is used to capture the image.

The beam splitter 120 provides the image acquirer 130 with light received from the lens unit 110 or provides the lens unit 110 with light generated by the projector 140. In particular, as shown in FIG. 3, the beam splitter 120 includes a prism 121, a first aperture 123, a second aperture 125, and a black film 127.

The prism 121 controls a path of the light received from the lens 110 or a path of the light generated by the projector 140. In detail, if an image is captured, the prism 121 may transmit beams of the light received from the lens unit 110 in a frontward direction and refract the other beams of the light toward the image acquirer 130. If the image is displayed, the prism 121 may transmit beams of the light received from the projector 140 toward the lens unit 110 and refract the other beams of the light toward the black film 127.

The first aperture 123 is positioned between the prism 121 and the image acquirer 130 to adjust an amount of light provided to the image acquirer 130. In particular, if the image is captured, the first aperture 123 may adjust opening and closing degrees thereof to adjust an amount of light acquired by the image acquirer 130 under control of the controller 150.

The second aperture 125 is positioned between the prism 121 and the projector 140 to adjust an amount of light provided to the lens unit 110. In particular, if the image is captured, the second aperture 125 may be closed so as not to transmit light to the projector 140 under control of the controller 150. Also, if the image is displayed, the second aperture 125 may adjust opening and closing degrees to adjust an amount of light provided by the projector 140 under control of the controller 150.

The black film 127 absorbs light refracted from the prism 121 when displaying the image.

The image acquirer 130 generates an image by using a light signal received from the lens unit 110. In particular, as shown in FIG. 3, the image acquirer 130 includes an image sensor 131 and an image processor 133.

The image sensor 131 senses a light signal incident through the lens unit 110 and the beam splitter 120 by using a plurality of imaging devices, converts the sensed light signal into an electric signal, processes the electric signal, and outputs signal-processed data to the image processor 1330. According to an exemplary embodiment, the image sensor 131 may be a complementary metal oxide semiconductor (CMOS) image sensor, but this is only an exemplary embodiment. Therefore, the image sensor 131 may be realized as many other types of image sensors, including, for example, a charge-coupled device (CCD) image sensor.

The image sensor 131 includes a color filter to acquire a color image and primarily uses a filter referred to as a color filter array (CFA). The CFA has a structure in which pixels are arrayed, and each one of the pixels transmits only portion of light indicating one type of color and may have various structures according to array structures. The image sensor 131 includes an analog-to-digital converter (ADC) that converts an analog image signal into a digital data signal.

The image processor 133 processes data output from the image sensor 131 and stores the processed data in a storage medium under control of the controller 150. In detail, the image processor 133 performs preprocessing with respect to full size data. According to an exemplary embodiment, the preprocessing may be auto focusing (AF), automatic white balance (AWB), auto exposure (AE), or the like. The image processor 133 also performs still image processing (IPC-S). The image processor 133 may store full size data, on which IPC-S is performed, in the storage medium.

The projector 140 provides light to the lens unit 110 to display an image. According to an exemplary embodiment, the projector 140 may be driven according to a light-emitting diode (LED) projector method and includes a light source 141, an LED panel 143, and a DLP chip 145, as shown in FIG. 3.

The light source 141 provides red (R), green (G), and blue (B) beams for generating the image. The LED panel 143 generates the R, G, and B beams provided from the light source 141 as one image and transmits the generated image toward the DLP chip 145. The DLP chip 145 reflects the transmitted image toward the beam splitter 120.

As described above, the projector 140 that is driven according to the LED projector method is only an exemplary embodiment. Therefore, the projector 140 may be driven according to other methods.

The communicator 160 communicates with an external device by using various communication methods. In particular, the communicator 160 may transmit control information to the home control device 200 to control the plurality of electronic devices 300-1, 300-2, 300-3, . . . . According to an exemplary embodiment, the communicator 160 may use a Wi-Fi module, Ethernet, or the like but is not limited thereto.

The controller 150 controls an overall operation of the view sensor 100. In particular, if the image is captured, the controller 150 may control the beam splitter 120 to provide the image acquirer 130 with light received from the lens unit 110. If the image is displayed, the controller 150 may control the beam splitter 120 to provide the lens unit 110 with light generated by the projector 140.

Figure 4:
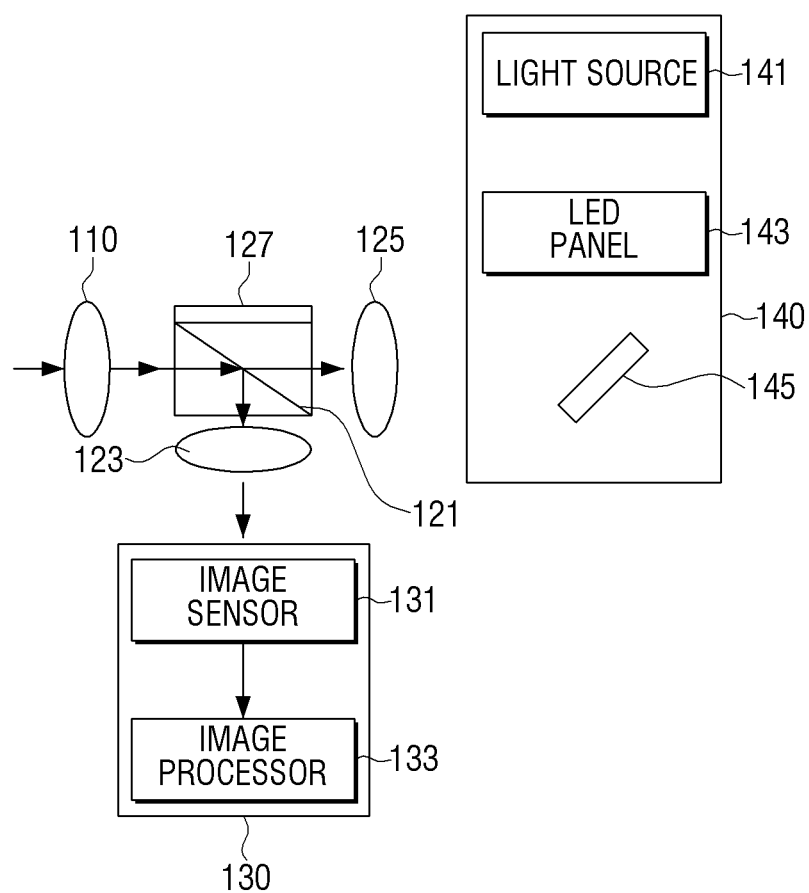
FIG. 4 is a view illustrating a flow of light if a view sensor captures a user, according to an exemplary embodiment.

In detail, if the image is captured, the controller 140 may control the beam splitter 120 to close the second aperture 125. In other words, as shown in FIG. 4, if the image is captured, light is received through the lens unit 110. According to an exemplary embodiment, the controller 150 may control the beam splitter 120 to close the second aperture 125 in order to refract beams of the light received from the lens unit 110 toward the image acquirer 130 through the prism 121. Also, the controller 150 may control to penetrate the other beams of the light received from the lens unit 110 through the prism 121 so as not to allow the other beams to be incident onto the projector 140.

Figure 5:
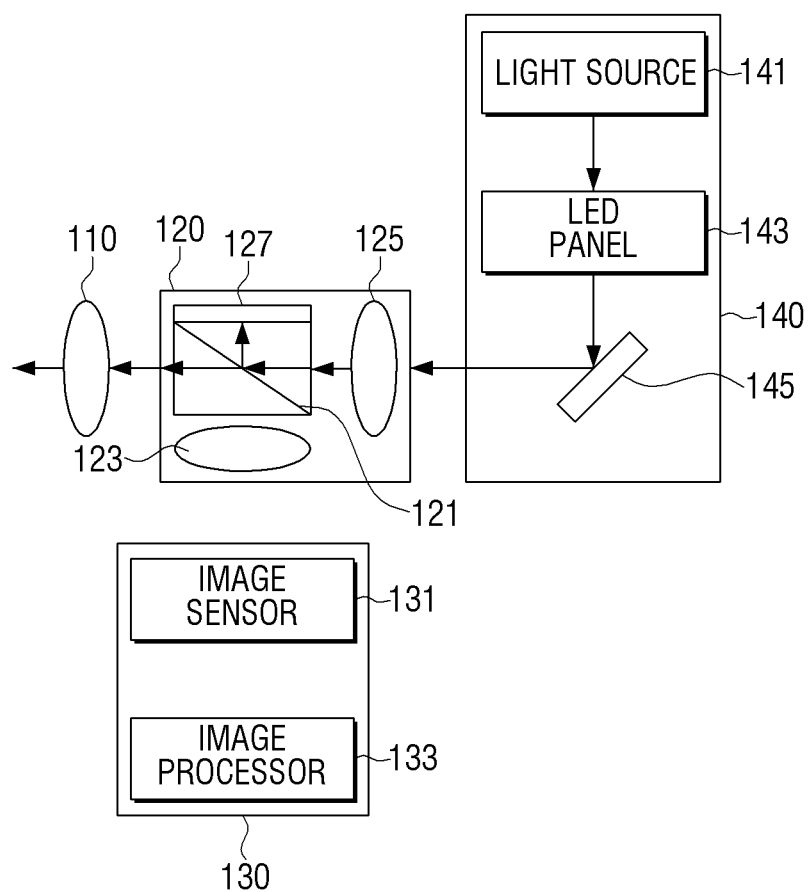
FIG. 5 is a view illustrating a flow of light if a view sensor displays an image, according to an exemplary embodiment.

If the image is displayed, the controller 150 may control the beam splitter 120 to open the second aperture 125. In other words, as shown in FIG. 5, if the image is displayed, the projector 140 may generate light for transmitting an image and transmit the generated light toward the second aperture 125. The light that has passed through the second aperture 125 may penetrate through the prism 121 and the lens unit 110.

Figure 6:
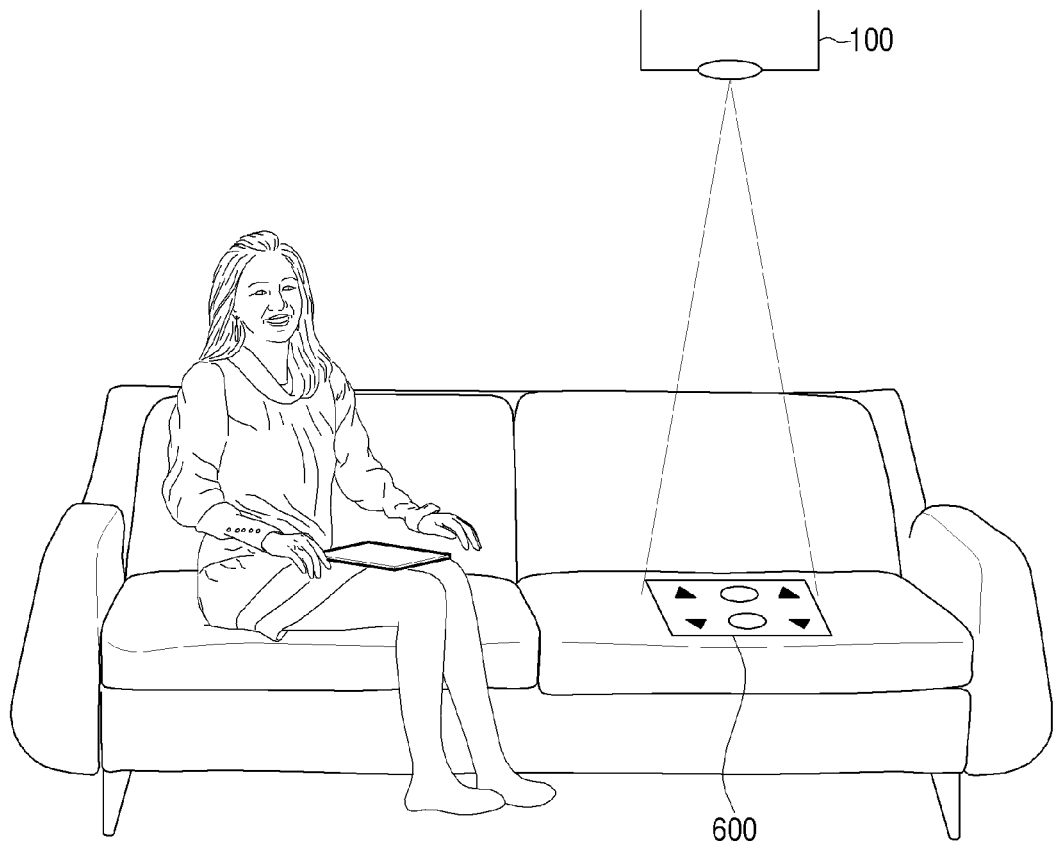
FIG. 6 is a view illustrating a process of displaying an image through a view sensor, according to an exemplary embodiment.

According to an exemplary embodiment, as shown in FIG. 6, an image 600 generated by the projector 140 may be projected to an area (e.g., an area selected from a piece of furniture, a wall, or a floor) around a user.

The controller 150 may determine whether an image sensed through the image acquirer 130 includes the user. If it is determined that the image includes the user, the controller 150 may analyze the image including the user to generate user information and control information. The controller 150 may also control the communicator 160 to transmit at least one selected from the user information and the control information to the home control device 200.

In detail, if it is determined that the image includes the user, the controller 150 may analyze the image acquired through the image acquirer 130 to acquire user information. According to an exemplary embodiment, the user information may include user position information, user ID information, etc. In particular, the controller 150 may acquire the user position information by using ID information of the view sensor 100 stored in a storage unit (not shown).

Also, the controller 150 may control the communicator 160 to transmit the acquired user information to the home control device 200. In particular, the controller 150 may control the communicator 160 to transmit the user position information to the home control device 200.

The controller 150 may control the communicator 160 to receive information about the electronic device 300 corresponding to the view sensor 100 from the home control device 200. According to an exemplary embodiment, the electronic device 300 corresponding to the view sensor 100 may be an electronic device that is positioned nearest to the view sensor 100.

The controller 150 may control the projector 140 and the beam splitter 120 to display a UI for controlling the electronic device 300 corresponding to the view sensor 100.

According to an exemplary embodiment, if a user motion is sensed by using the UI for controlling the electronic device 300 corresponding to the view sensor 100, the controller 150 may generate control information corresponding to the user motion. For example, if a user motion, such as a rotation of a hand of the user on a mute icon of a plurality of icons of the UI for controlling the electronic device 300, is sensed, the controller 150 may generate a control command that is to perform a mute function corresponding to the user motion. The controller 150 may control the communicator 160 to transmit the generated control information.

If it is determined that the image does not include the user, the controller 150 may control the communicator 160 to generate an event indicating that it is impossible to sense the user and transmit the event to the home control device 200.

As described above, the user may further intuitively and conveniently control an external electronic device by using the view sensor 100 that simultaneously performs an image capturing function and an image displaying function.

According to an exemplary embodiment, the home control system 10 may provide a UI that actively controls an electronic device according to a movement of the user.

Figure 7A:
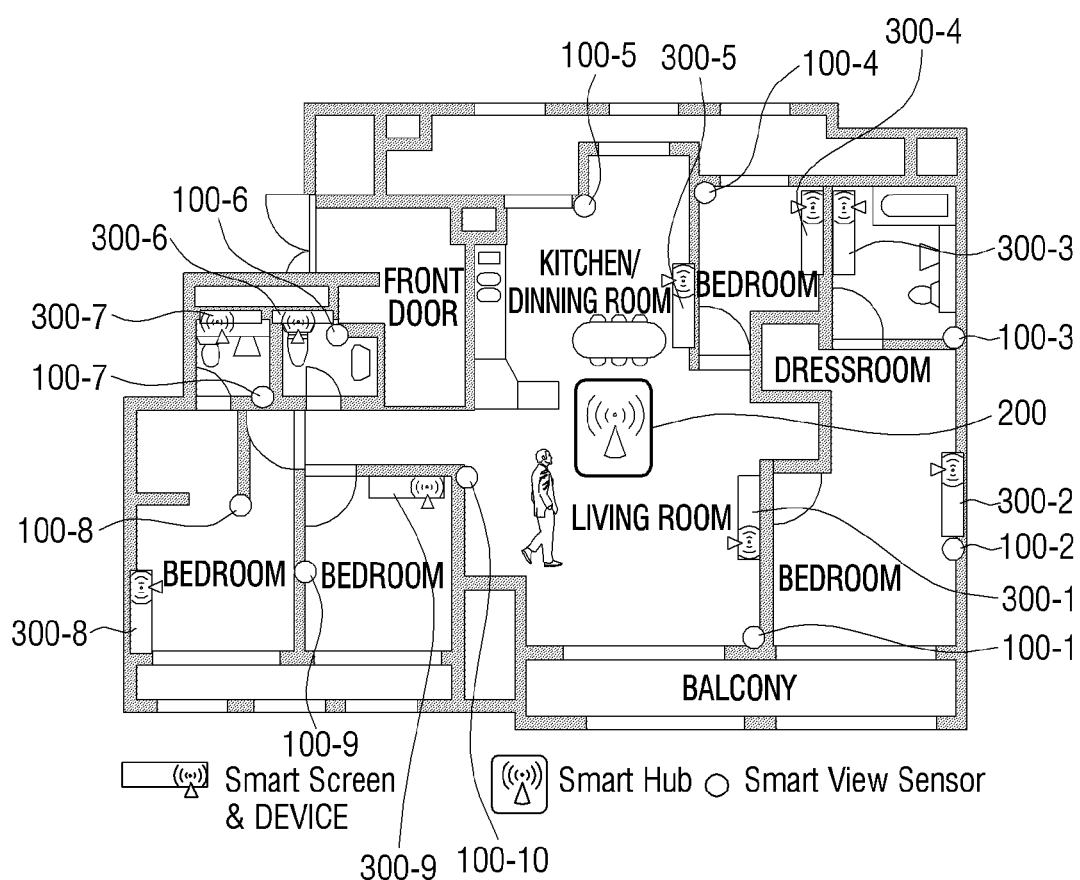
FIGS. 7A and 7B are views illustrating a process of enabling a user to continuously view an image through a plurality of display apparatuses if the user moves, according to an exemplary embodiment.

In detail, as shown in FIG. 7A, if, for example, a first view sensor 100-1 positioned in a living room senses a user, the first view sensor 100-1 may transmit user position information indicating that a position of the user is in the living room to the home control device 200.

The home control device 200 may transmit information about the first electronic device 300-1 corresponding to the first view sensor 100-9 to the first view sensor 100-9.

Figure 8A:
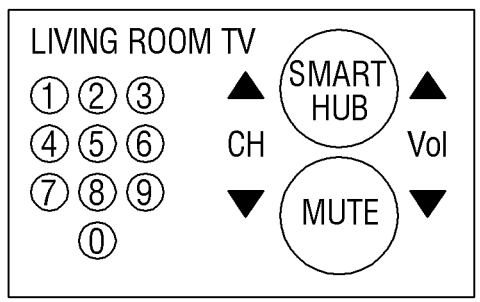
FIGS. 8A and 8B are views illustrating a process of changing a user interface (UI) for controlling a plurality of display apparatuses if a user moves, according to an exemplary embodiment.

If the information about the first electronic device 300-1 is received, the first view sensor 100-1 may display a UI for controlling the first electronic device 300-1 as shown in FIG. 8A.

Figure 7B:
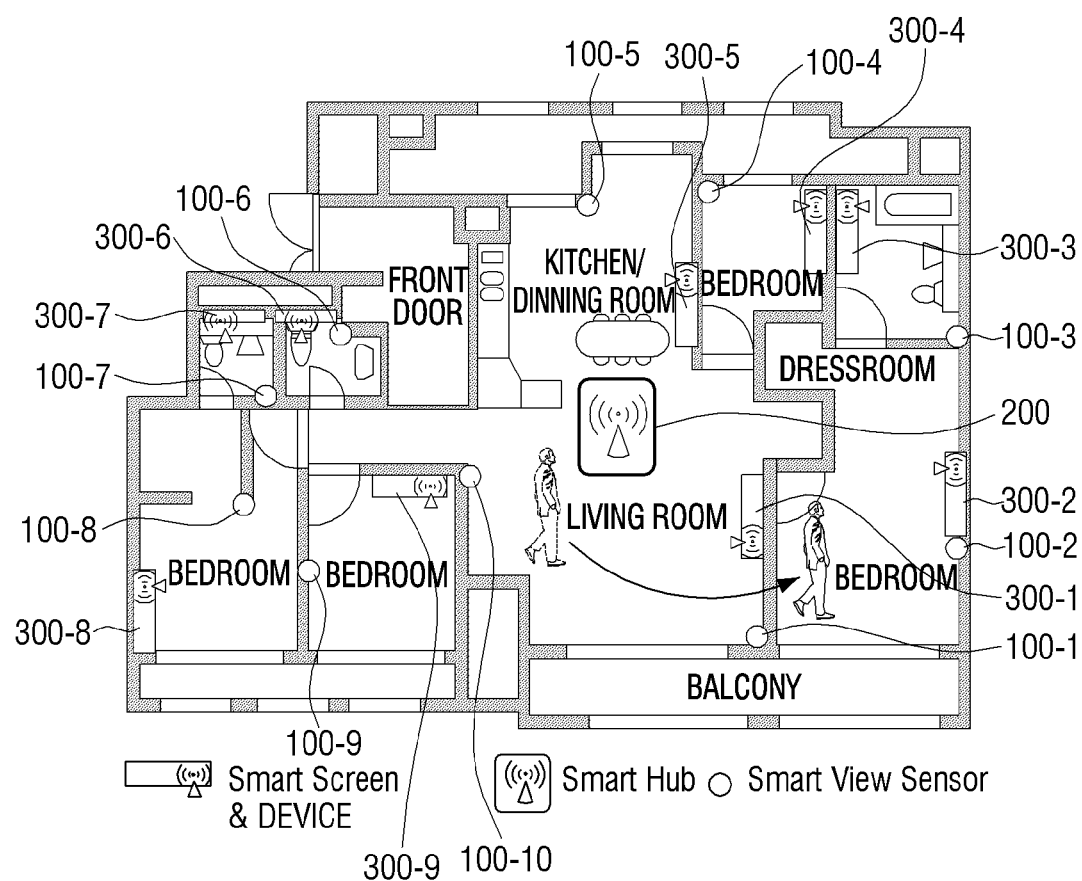

If the user moves from the living room into a bedroom as shown in FIG. 7B, the first view sensor 100-1 may transmit information indicating that it is impossible to sense the user, to the home control device 200. The home control device 200 may respond to the information by transmitting a power off command to the first electronic device 300-1.

If the second view sensor 100-2 positioned in the bedroom senses the user, the second view sensor 100-2 may transmit user position information indicating that a position of the user is in the bedroom to the home control device 200.

The home control device 200 may transmit information about the second electronic device 300-2 corresponding to the second view sensor 100-2 to the second view sensor 100-2.

Figure 8B:
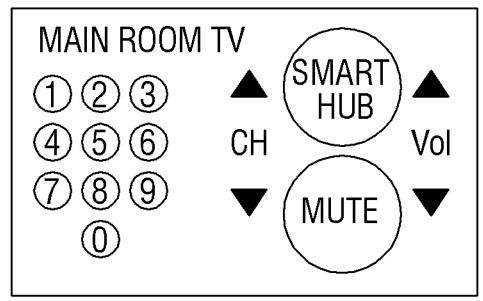

If the information about the second electronic device 300-2 is received, the second view sensor 100-2 may display a UI for controlling the second electronic device 300-2 as shown in FIG. 8B. According to an exemplary embodiment, the UI for controlling the second electronic device 300-2 may have the same type as the UI for controlling the first electronic device 300-1.

As described above, as the user moves around an area (e.g., a house), a UI for controlling an electronic device corresponding to a position of the user may be provided to the user so as to enable the user to further conveniently and easily control the electronic device without a remote controller.

Methods of controlling a home control system according to various exemplary embodiments will now be described with reference to FIGS. 9 through 14.

FIG. 9 is a sequence diagram illustrating a method of controlling the electronic device 300 by using the view sensor 100, according to an exemplary embodiment.

In operation S905, the first view sensor 100-1 senses a user. According to an exemplary embodiment, the first view sensor 100-1 may acquire position information of the sensed user.

In operation S910, the first view sensor 100-1 transmits the position information of the user to the home control device 200.

In operation S915, the home control device 200 transmits wireless power to the first electronic device 300-1. According to an exemplary embodiment, the first electronic device 300-1 is an electronic device corresponding to the first view sensor 100-1 and may be positioned nearest to the first view sensor 100-1.

In operation S920, the first electronic device 100-1 is turned on in response to the wireless power and displays image content. According to an exemplary embodiment, the image content displayed by the first electronic device 300-1 may be received by the home control device 200.

In operation S925, the home control device 200 transmits information about the first electronic device 300-1 to the first view sensor 100-1. According to an exemplary embodiment, the information about the first electronic device 300-1 may include at least one selected from a type, a position, and UI structure information of the first electronic device 300-1.

In operation S930, the first view sensor 100-1 displays a UI for controlling the first electronic device 300-1. According to an exemplary embodiment, the UI for controlling the first electronic device 300-1 may be projected onto a wall, a floor, a piece of furniture, or the like to be generated as shown in FIG. 6.

In operation S935, the first view sensor 100-1 senses a user motion. According to an exemplary embodiment, the user motion may be a user motion using the UI for controlling the first electronic device 300-1, but this is only an exemplary embodiment. Therefore, the user motion may also be a user motion that is unrelated to the UI.

In operation S940, the first view sensor 100-1 generates control information corresponding to the user motion. In operation S945, the first view sensor 100-1 transmits the generated control information to the home control device 200.

In operation S950, the home control device 200 transmits the control information to the first electronic device 300-1. In operation S955, the first electronic device 300-1 performs a function corresponding to the control information.

According to the above-described exemplary embodiment, the user may further conveniently control an electronic device nearest to the user without a remote controller.

FIG. 10 is a sequence diagram illustrating a method of enabling a user to continuously view image content through another electronic device if the user moves, according to an exemplary embodiment.

In operation S1005, the first view sensor 100-1 senses a user. According to an exemplary embodiment, the first view sensor 100-1 may acquire user position information when sensing the user. In operation S1010, the first view sensor 100-1 transmits the user position information to the home control device 200.

In operation S1015, the home control device 200 transmits wireless power and image content to the first electronic device 300-1. In operation S1020, the first electronic device 300-1 is turned on. In operation S1025, the first electronic device 300-1 displays the image content.

In operation S1030, the first view sensor 100-1 determines that it is impossible to sense the user. In other words, the first view sensor 100-1 may determine that the user disappears from a captured image. In operation S1035, the first view sensor 100-1 transmits information indicating that it is impossible to sense the user to the home control device 200.

In operation S1040, the home control device 200 transmits a power off command to the first electronic device 300-1. In operation S1045, the first electronic device 300-1 is turned off.

In operation S1050, the second view sensor 100-2 senses the user. According to an exemplary embodiment, the second view sensor 100-2 may also acquire position information of the user who has moved, when sensing the user. In operation S1055, the second view sensor 100-2 transmits the position information of the user to the home control device 200.

In operation S1060, the home control device 200 transmits wireless power and the image content to the second electronic device 300-2. According to an exemplary embodiment, the transmitted image content may be the same image content as the image content transmitted to the first electronic device 300-1 and may be transmitted from when the transmission of the image content to the first electronic device 300-1 ends. In operation S1065, the second electronic device 300-2 is turned on. In operation S1070, the second electronic device 300-2 displays the image content.

According to the above-described exemplary embodiment, although the user moves, the user may continuously view an image through several electronic devices.

FIG. 11 is a sequence diagram illustrating a method of providing a user with a UI for controlling another electronic device if the user moves, according to an exemplary embodiment.

In operation S1105, the first view sensor 100-1 senses a user. According to an exemplary embodiment, the first view sensor 100-1 may acquire position information of the sensed user when sensing the first user. In operation S1110, the first view sensor 100-1 transmits the position information of the user to the home control device 200.

In operation S1115, the home control device 200 transmits wireless power and image content to the first electronic device 300-1 corresponding to the first view sensor 100-1. In operation S1120, the first electronic device 300-1 is turned on and displays the image content.

In operation S1125, the home control device 200 transmits information about the first electronic device 300-1 to the first view sensor 100-1. In operation S1130, the first view sensor 100-1 displays a UI for controlling the first electronic device 300-1.

In operation S1135, the first view sensor 100-1 determines that it is impossible to sense the user. In operation S1140, the first view sensor 100-1 transmits information indicating that it is impossible to sense the user to the home control device 200. In operation S1145, the home control device 200 transmits a power off command to the first electronic device 300-1. In operation S1150, the first electronic device 300-1 is turned off.

If the user moves, the second view sensor 100-2 senses the user who has moved, in operation S1155. According to an exemplary embodiment, the second view sensor 100-2 may also acquire position information of the user when sensing the user. In operation S1160, the second view sensor 100-2 transmits the position information of the user who has moved, to the home control device 200.

In operation S1165, the home control device 200 transmits wireless power and the image content to the second electronic device 300-2 corresponding to the second view sensor 100-2. In operation S1170, the second electronic device 300-2 is turned on and displays the image content. According to an exemplary embodiment, the image content displayed by the second electronic device 300-2 may be the same as the image content displayed by the first electronic device 300-1.

In operation S1175, the home control device 200 transmits information about the second electronic device 300-2 to the second view sensor 100-2. In operation S1180, the second view sensor 100-2 displays a UI for controlling the second electronic device 300-2. According to an exemplary embodiment, the UI for controlling the second electronic device 300-2 may be an integrated UI that is the same type as the UI for controlling the first electronic device 300-1.

According to the above-described exemplary embodiment, although the user moves without a remote controller, the user may further conveniently and easily control an electronic device positioned nearest to the user.

Figure 12:
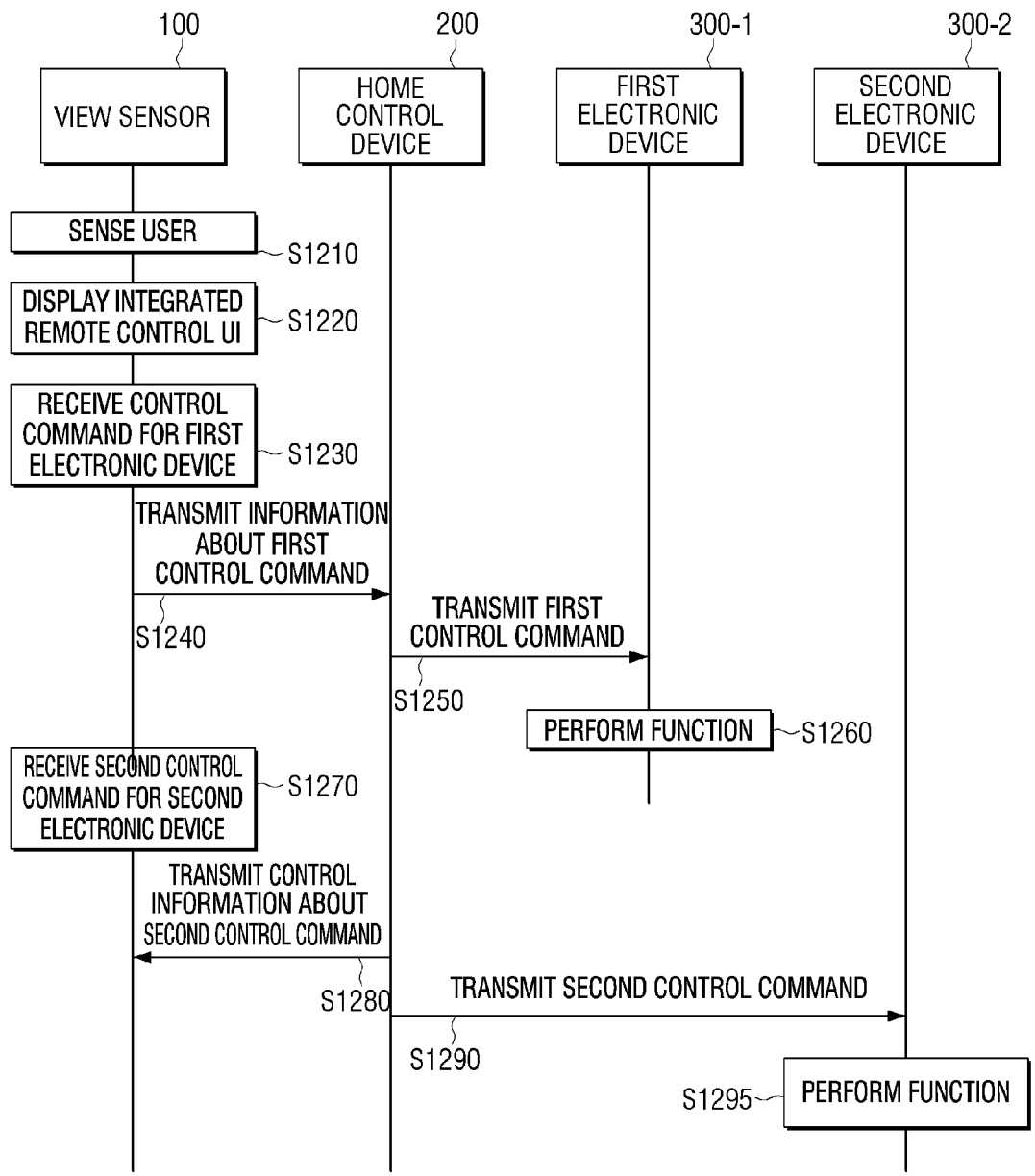
FIG. 12 is a sequence diagram illustrating a method of controlling a home control system, according to another exemplary embodiment.

FIG. 12 is a sequence diagram illustrating a method of providing an integrated remote control UI that controls a plurality of electronic devices, according to an exemplary embodiment.

In operation S1210, the view sensor senses a user.

Figure 13:
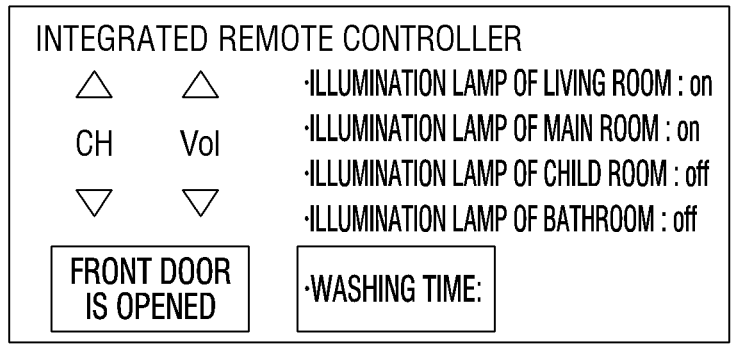
FIG. 13 is a view illustrating an integrated UI provided by a view sensor, according to another exemplary embodiment.

In operation S1220, the view sensor 100 displays an integrated remote control UI. According to an exemplary embodiment, the integrated remote control UI may be a remote controller UI that receives a user command for controlling the plurality of electronic devices 300-1, 300-2, 300-3, . . . . According to an exemplary embodiment, the integrated remote control UI may control various types of electronic devices such as a TV, an illumination lamp, a front door, a washing machine, etc., and may further control a plurality of the same type of electronic devices, such as, for example, a plurality of illumination lamps located in several different rooms, as shown in FIG. 13.

In operation S1230, the view sensor 100 receives a first control command for the first electronic device 300-1. For example, the view sensor 100 may receive a control command to turn up a volume of the TV.

In operation S1240, the view sensor 100 transmits information about the first control command to the home control device 200. In operation S1250, the home control device 200 transmits the first control command to the first electronic device 300-1. In operation S1260, the first electronic device 300-1 performs a function corresponding to the first control command. For example, if the first electronic device 300-1 is the TV, the first electronic device 300-1 may increase the volume of the TV by one level.

In operation S1270, the view sensor 100 receives a second control command for the second electronic device 300-2. For example, the view sensor 100 may receive a control command to open the front door.

In operation S1280, the view sensor 100 transmits information about the second control command to the home control device 200. In operation S1290, the home control device 200 transmits the second control command to the second electronic device 300-2. In operation S1295, the second electronic device 300-2 performs a function corresponding to the second control command. For example, if the second electronic device 300-2 is the front door, the second electronic device 300-2 may perform a function of opening the front door.

According to the above-described exemplary embodiment, the user may control the plurality of electronic devices 300-1, 300-2, 300-3, . . . with an integrated remote control UI, and thus, the user does not need to use a remote controller or a plurality of remote controllers which may be located in several different locations.

Figure 14:
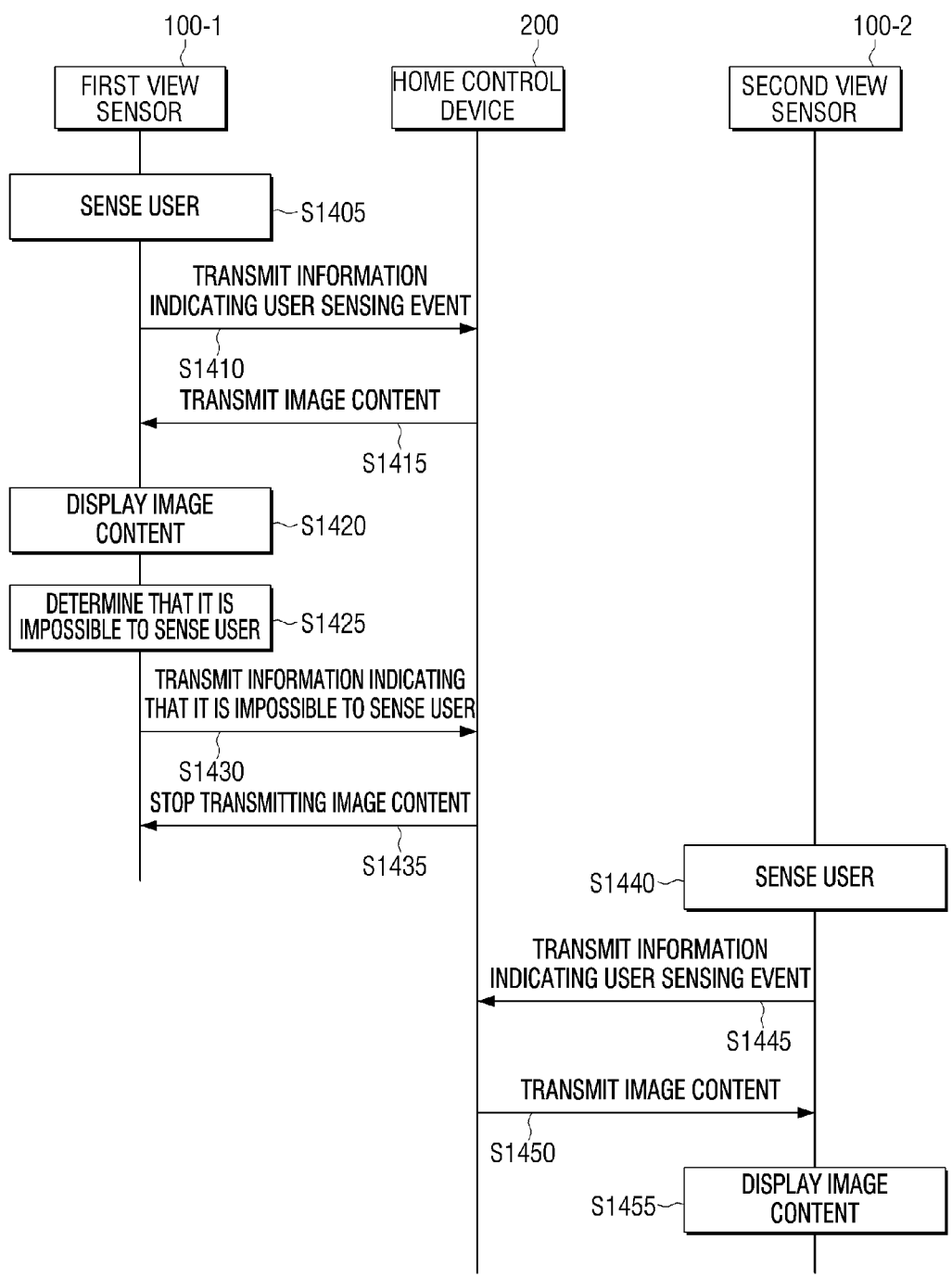
FIG. 14 is a sequence diagram illustrating a method of controlling a home control system, according to another exemplary embodiment.

FIG. 14 is a sequence diagram illustrating a method of directly displaying image content through a view sensor, according to an exemplary embodiment.

In operation S1405, the first view sensor 100-1 senses a user. In operation S1410, the first view sensor 100-1 transmits information indicating a user sensing event to the home control device 200. In operation S1415, the home control device 200 responds to the information indicating the user sensing event by transmitting image content to the first view sensor 100-1.

In operation S1420, the first view sensor 100-1 displays the image content. According to an exemplary embodiment, the first view sensor 100-1 may project the image content into an arbitrary area near a place where the user is positioned.

In operation S1425, the first view sensor 100-1 determines that it is impossible to sense the user. In operation S1430, the first view sensor 100-1 transmits information indicating that it is impossible to sense the user to the home control device 200. In operation S1435, the home control device 200 stops transmitting the image content in response to receiving the information transmitted in operation S1430.

If the user moves, the second view sensor 100-2 that is positioned in a different place from a place where the first view sensor 100-1 is positioned senses the user in operation S1440. In operation S1445, the second view sensor 100-2 transmits information indicating a user sensing event to the home control device 200. In operation S1450, the home control device 200 transmits the image content to the second view sensor 100-2 in response to receiving the information indicating the user sensing event. According to an exemplary embodiment, the transmitted image content may be the same image content as the image content transmitted to the first view sensor 100-1.

In operation S1455, the second view sensor 100-2 displays the image content. According to an exemplary embodiment, the second view sensor 100-2 may project the image content into an arbitrary area near a place where the moved user is positioned.

According to the above-described exemplary embodiment, even if the user moves, the user may continuously view image content through the plurality of view sensors 100-1, 100-2, 100-3, . . . without using a display apparatus.

A device according to exemplary embodiments may include UI devices such as a processor, a memory that stores and executes program data, a permanent storage such as a disk drive, a communication port that communicates with an external device, a touch panel, keys, buttons, etc. Methods that are realized as software modules or algorithms may be stored as computer-readable codes or program commands executable on the processor on a computer-readable recording medium. According to an exemplary embodiment, examples of the computer-readable recording medium include a magnetic storage medium (e.g., a read only memory (ROM), a random access memory (RAM), a floppy disc, a hard disc, or the like) and an optical reading medium (e.g. a CD-ROM, a digital versatile disc (DVD), or the like), etc. The computer-readable recording medium may store and execute a computer-readable code that is distributed onto computer systems that are connected to one another through a network to be read by a computer in a distribution fashion. A medium may be read by a computer, stored on a memory, and executed by a processor.

The exemplary embodiments may be embodied as functional block structures and various processing operations. The functional block may be embodied as various types of software and/or software structures that execute particular functions. For example, the exemplary embodiments may use integrated circuit (IC) structures such as a memory that executes various functions under control of one or more microprocessors or through other types of control devices, processing, a logic device, a look-up table, etc. Like elements may be executed as software programming or software elements, and the exemplary embodiments may include various algorithms that are realized with combinations of data structures, processes, routines, and other programming structures to be embodied as a programming or scripting language such as C, C++, Java, assembler, or the like. Functional sides may be embodied as an algorithm that is executed by one or more processors. The exemplary embodiments may use existing technologies for electronic environment setting, signal processing, and/or data processing, etc. Terms such as "mechanism", "element", "means", and "structure" may be widely used and are not limited to mechanical and physical structures. The terms may be linked to a processor, etc., to include a meaning of a series of routines of software.

Particular executions that are described in the exemplary embodiments are exemplary and do not limit a technical range. For convenience of the specification, descriptions of existing electronic structures, control systems, software, and other functional sides of the systems may be omitted. Also, linkages of lines between elements illustrated in the drawings or connection members exemplarily indicate functional connections and/or physical or circuit connections. Therefore, in an actual device, the linkages of the lines or the connection members may indicate replaceable or additional various functional connections, physical connections, or circuit connections.

The use of the term "the", as used in the specification (in particular, in the claims), or a similar term, may correspond to the singular or the plural. Also, if a range is described, the range may include individual values (if there is no description to the contrary). Therefore, the individual values of the range may correspond to values described in the detailed description, although are not limited thereto. Orders of operations constituting a method may be clearly described or if there is no description, the operations may be performed in appropriate orders. However, the orders of the operations are not limited thereto. Use of all examples or exemplary terms (e.g., etc.) is intended to simply describe a technical concept, and thus, the scope of claims is not limited by the examples or the exemplary terms.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A view sensor comprising:
a lens configured to receive light in order to capture an image or project light in order to display the image;
an image processor configured to acquire the image by using the light received from the lens;
a projector configured to provide light to the lens in order to display the image;
a beam splitter configured to provide the image processor with the light received from the lens or transmit the light generated by the projector to the lens; and
a control processor configured to, in response to the image being captured, control the beam splitter to provide the image processor with the light received from the lens and, in response to the image being displayed, control the beam splitter to provide the lens with the light generated by the projector, wherein the control processor is further configured to sense whether a user is included in the image based on the light acquired by the image processor and thereby acquire a sensing result, receive information corresponding to an electronic device based on the sensing result, and control the projector to project a user interface comprising a plurality of icons for controlling the electronic device based on the received information.

2. The view sensor of claim 1, wherein the beam splitter comprises:
   a prism configured to change a direction of the light received from the lens or the light provided from the projector;
   a first aperture configured to be positioned between the prism and the image processor in order to adjust an amount of the light provided to the image processor; and
   a second aperture configured to be positioned between the prism and the projector in order to adjust an amount of the light provided to the lens.

3. The view sensor of claim 2, wherein:
   to capture the image, the control processor is configured to open the first aperture to provide the processor with beams of the light that are received from the lens and reflected from the prism and close the second aperture to prevent the projector from receiving the beams of the light that are received from the lens and penetrate the prism; and
   to display the image, the control processor is configured to open the second aperture to transmit the light provided from the projector.

4. The view sensor of claim 1, wherein the image processor is further configured to convert the light received from the lens into an electric signal; and
   to process the electric signal to generate the image.

5. The view sensor of claim 1, wherein the projector comprises:
   a light source configured to provide red (R), green (G), and blue (B) beams;
   a light-emitting diode (LED) panel configured to generate the image based on the R, G, and B beams provided from the light source and transmit the generated image; and
   a digital light processing (DLP) chip configured to reflect the transmitted image toward the beam splitter.

6. The view sensor of claim 1, further comprising:
   a communicator configured to communicate with an external device,
   wherein the control processor is configured to control the communicator to analyze the image that comprises an image of a user and is acquired by the image processor and generate user information and control information based on the analyzed image, and transmit at least one selected from the user information and the control information to the external device.

7. The view sensor of claim 6, wherein the control processor is configured to analyze a user motion to generate control information based on one of the plurality of icons projected corresponding to the user motion analyzed, and control the communicator to transmit the control information to the external device.

8. The view sensor of claim 7, wherein the control processor is configured to analyze the image acquired through the image processor to analyze user position information and control the communicator to transmit the analyzed user position information to the external device,
   wherein the external device is configured to analyze the user position information to transmit image content to an electronic device which is nearest to the user among a plurality of electronic devices.

9. A home control system comprising:
   a plurality of electronic devices;
   a plurality of view sensors configured to display a user interface (UI) for controlling at least one electronic device selected from the plurality of electronic devices and capture an image of a user to acquire position information of the user and control information; and
   a home control device configured to receive position information of the user from a first view sensor of the plurality of view sensors, analyze the position information, transmit information about a first electronic device of the plurality of electronic devices corresponding to a position of the user to the first view sensor, and in response to control information being received from the first view sensor, transmit the control information to the first electronic device,
   wherein each of the plurality of view sensors comprises:
      a lens configured to receive light in order to capture an image or project light in order to display the image;
      an image processor configured to acquire the image by using the light received from the lens;
      a projector configured to provide light to the lens in order to display the image;
      a beam splitter configured to provide the image processor with the light received from the lens or transmit the light generated by the projector to the lens; and
      a control processor configured to, in response to the image being captured, control the beam splitter to provide the image processor with the light received from the lens and, in response to the image being displayed, control the beam splitter to provide the lens with the light generated by the projector,
      wherein the control processor is further configured to sense whether a user is included in the image based on the light acquired by the image processor and thereby acquire a sensing result, receive information corresponding to the electronic device based on the sensing result, and control the projector to project a user interface comprising a plurality of icons for controlling an electronic device based on the received information.

10. The home control system of claim 9, wherein the beam splitter comprises:
    a prism configured to change a direction of the light received from the lens or the light provided from the projector;
    a first aperture configured to be positioned between the prism and the image processor to adjust an amount of the light provided to the image acquirer; and
    a second aperture configured to be positioned between the prism and the projector to adjust an amount of the light provided to the lens.

11. The home control system of claim 9, wherein in response to a second view sensor of the plurality of view sensors sensing the user moving when image content is displayed on the first electronic device, the second view sensor is configured to transmit a position of the moved user to the home control device, and the home control device is configured to transmit the image content to a second electronic device of the plurality of electronic devices corresponding to a position of the moved user.

12. The home control system of claim 11, wherein the second view sensor is configured to display a UI for controlling the second electronic device.

13. The home control system of claim 9, wherein the first view sensor is configured to capture a user motion by using a UI for controlling the first electronic device and to transmit a control command corresponding to the user motion to the home control device.

14. A method of controlling a home control system, the method comprising:
in response to a first view sensor sensing a user, the first view sensor being among a plurality of view sensors, transmitting position information of the sensed user from the first view sensor to a home control device;
transmitting information about a first electronic device corresponding to the position information of the user from the home control device to the first view sensor;
displaying a user interface (UI) for controlling the first electronic device using the first view sensor;
sensing a user motion through the UI and generating control information and transmitting the generated control information from the first view sensor to the home control device; and
transmitting the control information from the home control device to the first electronic device,
wherein each of the plurality of view sensors is configured to:
receive, by a lens, light in order to capture an image or project light in order to display the image;
acquire, by an image processor, the image by using the light received from the lens;
provide, by a projector, light to the lens in order to display the image;
provide, by a beam splitter, the image processor with the light received from the lens or transmit the light generated by the projector to the lens; and
in response to the image being captured, control, by a control processor, the beam splitter to provide the image processor with the light received from the lens and, in response to the image being displayed, control the beam splitter to provide the lens with the light generated by the projector; and
sense, by the control processor, whether the user is included in the image based on the light acquired by the image processor and thereby acquire a sensing result, receive information corresponding to the electronic device based on the sensing result, and control the projector to project a user interface comprising a plurality of icons for controlling an electronic device based on the received information.

15. The method of claim 14, further comprising:
transmitting image content from the home control device to the first electronic device;
in response to a second view sensor of the plurality of view sensors sensing movement of the user, transmitting position information of the moved user from the second view sensor to the home control device; and
determining a second electronic device corresponding to a position of the moved user through the home control device based on the position information of the moved user and transmitting the image content to the second electronic device.

16. The method of claim 15, further comprising:
transmitting information about the second electronic device from the home control device to the second view sensor;
displaying, by the second view sensor, a UI for controlling the second electronic device;
sensing a user motion through the UI, generating control information based on the sensed user motion, and transmitting the generated control information to the home control device; and
transmitting a control command based on the control information from the home control device to the second electronic device.

17. A home control system, comprising:
a first view sensor configured to communicate with a first electronic device located in a first position, the first view sensor being configured to sense a motion of a user and to generate and project a first user interface (UI) to control the first electronic device;
a second view sensor configured to communicate with a second electronic device located in a second position different from the first position, the second view sensor being configured to sense the motion of the user and to generate and project a second user interface (UI) to control the second electronic device; and
a home control device configured to control whether the first view sensor or the second view sensor generates and projects the first UI or the second UI, respectively, according to whether the first view sensor or the second view sensor senses the motion of the user
wherein each of the first view sensor and the second view sensor comprises:
a lens configured to receive light in order to capture an image or project light in order to display the image;
an image processor configured to acquire the image by using the light received from the lens;
a projector configured to provide light to the lens in order to display the image;
a beam splitter configured to provide the image processor with the light received from the lens or transmit the light generated by the projector to the lens; and
a control processor configured to, in response to the image being captured, control the beam splitter to provide the image processor with the light received from the lens and, in response to the image being displayed, control the beam splitter to provide the lens with the light generated by the projector,
wherein the control processor is further configured to sense whether the user is included in the image based on the light acquired by the image processor and thereby acquire a sensing result, receive information corresponding to the electronic device based on the sensing result, and control the projector to project a user interface comprising a plurality of icons for controlling an electronic device based on the received information.

18. The home control system of claim 17, wherein the first and second view sensors are configured to optically sense motions of the user on the first and second UIs, respectively, to thereby control the first and second electronic devices, respectively.

19. The home control system of claim 17, wherein the home control device is further configured to control one of the first electronic device and the second electronic device to display content, according to whether the first view sensor or the second view sensor senses the motion of the user.

* * * * *